United States Patent [19]
Janz

[11] Patent Number: 5,164,863

[45] Date of Patent: * Nov. 17, 1992

[54] METHOD FOR WRITING SERVO PATTERNS TO A DISC OF A HARD DISC DRIVE

[75] Inventor: Donald W. Janz, Oklahoma City, Okla.

[73] Assignee: Seagate Technology, Inc., Scotts Valley, Calif.

[ * ] Notice: The portion of the term of this patent subsequent to Sep. 5, 2006 has been disclaimed.

[21] Appl. No.: 752,100

[22] Filed: Aug. 29, 1991

Related U.S. Application Data

[60] Continuation of Ser. No. 398,166, Aug. 24, 1989, Pat. No. 5,095,393, which is a continuation-in-part of Ser. No. 275,854, Nov. 25, 1988, Pat. No. 4,864,434, Division of Ser. No. 932,814, Nov. 19, 1986, Pat. No. 4,811,135, and a continuation-in-part of Ser. No. 800,019, Nov. 20, 1985, abandoned.

[51] Int. Cl.⁵ ............................................. G11B 5/024
[52] U.S. Cl. ...................................................... 360/57
[58] Field of Search .................... 360/57, 77.02, 77.05, 360/135

[56] References Cited

U.S. PATENT DOCUMENTS 4,414,589 11/1983 Oliver et al. ..................... 360/77.07
4,511,938 4/1985 Betts .................................... 360/135
4,602,304 7/1986 Fultz ................................. 360/77.05

OTHER PUBLICATIONS

IBM Technical Disclosure Bulletin, A. J. Betts, Null Servo Pattern, vol. 18, No. 8, Jan. 1976, pp. 2656-2657.
IBM Technical Disclosure Bulletin, R. K. Oswald, Track Following Servo Systems, vol. 18, No. 10, Mar. 1976, pp. 3424-3425.
IBM Technical Disclosure Bulletin, K. H. Schaller, Phase and Location Coded Servo Pattern for Controlling . . . , vol. 20, No. 5, Oct. 1977, pp. 1792-1794.

*Primary Examiner*—Joseph L. Dixon
*Assistant Examiner*—David L. Robertson
*Attorney, Agent, or Firm*—Edward P. Heller, III; Bill D. McCarthy; Louis W. Watson

[57] ABSTRACT

A method of writing servo patterns to the surface of a disc of a hard disc drive without magnetizing the transducer head by means of which the patterns are written. The surface is initially magnetized in one direction through the transducer head while the disc is rotating to move the disc surface by the transducer head. Each servo pattern is subsequently written by passing a current through the transducer in the opposite direction for selected time interval. Following writing of each pattern, a current is passed through the transducer head in the direction used to initially magnetize the disc for a time interval equal to the time interval during which the pattern was written.

2 Claims, 4 Drawing Sheets

METHOD FOR WRITING SERVO PATTERNS TO A DISC OF A HARD DISC DRIVE

CROSS-REFERENCE TO RELATED APPLICATIONS

The present application is a continuation-in-part of U.S. patent application Ser. No. 07/398,166 filed Aug. 24, 1989, now U.S. Pat. No. 5,095,393 issued Mar. 10, 1982, as a continuation-in-part of U.S. patent application Ser. No. 07/275,854 filed Nov. 25, 1988, now U.S. Pat. No. 4,864,434 issued Sep. 5, 1989, as a divisional application of U.S. patent application Ser. No. 06/932,814, filed Nov. 19, 1986, now U.S. Pat. No. 4,811,135 issued Mar. 7, 1989, as a continuation-in-part of my U.S. patent application Ser. No. 06/800,019 filed Nov. 20, 1985, and now abandoned.

BACKGROUND OF INVENTION

1. Field of the Invention

This invention relates to magnetic storage devices using transducers or recording heads for reading, writing and erasing data on a movable magnetic storage medium. The data typically are arranged in parallel tracks such that the transducer follows an individual track as the storage medium is moved. For example, in a rotatable disk the data are arranged in concentric tracks with the transducer radially movable with respect to the disk.

2. Brief Discussion of the Prior Art

As data density increases and the space between adjacent tracks is correspondingly reduced, it becomes advantageous to record transducer positioning or servo data on the recording medium, thus permitting more accurate positioning than is possible using exclusively mechanical means. An entire disk surface can be dedicated to servo positioning data, as shown in U.S. Pat. No. 3,864,740 to Sordello et al. granted Feb. 4, 1975. Alternatively, servo data can be written in sectors on the same medium surface containing the working data. This technique is called embedded servo and is disclosed in U.S. Pat. No. 3,185,972 to Sipple, granted May 25, 1965.

Transducer positioning using servo data is accomplished in two stages: coarse positioning or track seeking, in which the head is directed from a random location to a selected track; and fine positioning or track following, during which the transducer, already near the selected track, is maintained in a centered position with respect to the track. Preferably the servo data are divided into multiple frames of equal angular dimension, with servo information repeated in each frame. Also common is the use of sync bits, at least one in each track at the beginning of each frame. The sync bits signal entry into each frame, and establish automatic gain control (AGC) used in recognizing servo signals.

The continuing effort to place increased data on the same disk surface area raises problems of signal interference from servo patterns in tracks adjacent a desired servo track. Adjacent track interference can be reduced simply by reducing the radial dimension of each servo pattern, yet this reduces the dynamic range, meaning loss of a signal when the transducer is not sufficiently close to the servo track. Yet another problem, encountered when servo data is divided into angular frames, is the lack of phase coherence among the sync signals. This is due to the difficulty in placing sync signals from a given frame in exact angular alignment. The result of misalignment is unwanted modulation of the AGC signal.

Therefore, an object of this invention is to enable reduced spacing between adjacent servo tracks without a corresponding reduction in the servo pattern radial dimension. Another object of this invention is to increase the signal quality and dynamic range of servo signals by increasing the width of servo patterns on a data storage medium. Yet another object is to provide servo patterns usable to establish an AGC signal, for more consistent AGC signals obtained from various tracks and frames on the storage medium.

SUMMARY OF THE INVENTION

An aspect of the present invention is a process for writing servo information in substantially parallel tracks onto a magnetizable surface of a magnetic information storage medium. The process includes the steps of:

a. exposing a magnetizable surface of a magnetic storage medium to a first current level to cause said surface to assume a first magnetic polarity;

b. exposing selected first portions of the surface to a second and opposite current level to form in the surface a first longitudinal array of first servo patterns having a second and opposite magnetic polarity;

c. exposing selected second portions of the surface to the second current level to form in the surface a second longitudinal array of second servo patterns of the second magnetic polarity and parallel to the first array, and with the second servo patterns longitudinally offset from the first servo patterns;

d. exposing selected third portions of the surface to the second current level to form in the surface a third longitudinal array of third servo patterns having the second magnetic polarity, parallel to the first and second arrays, and with the third servo patterns longitudinally offset from the first and second servo patterns; and e. repeating Steps b-d until the surface contains a desired amount of servo information.

Preferably, each of the servo patterns is formed by moving the medium longitudinally with respect to a recording transducer positioned near the surface, and by supplying current at the second level to the transducer for a selected time, then immediately supplying current at said first level to the transducer for said selected time, and further by interrupting current to the transducer positioned near one of the longitudinal arrays, whenever the transducer is approximately transversely aligned with one of the servo patterns in an adjacent longitudinal array.

BRIEF DESCRIPTION OF THE DRAWINGS

These and other features and advantages of the invention will become apparent upon reading the following detailed description and upon reference to the drawings, in which.

DETAILED DESCRIPTION

Figure 1:
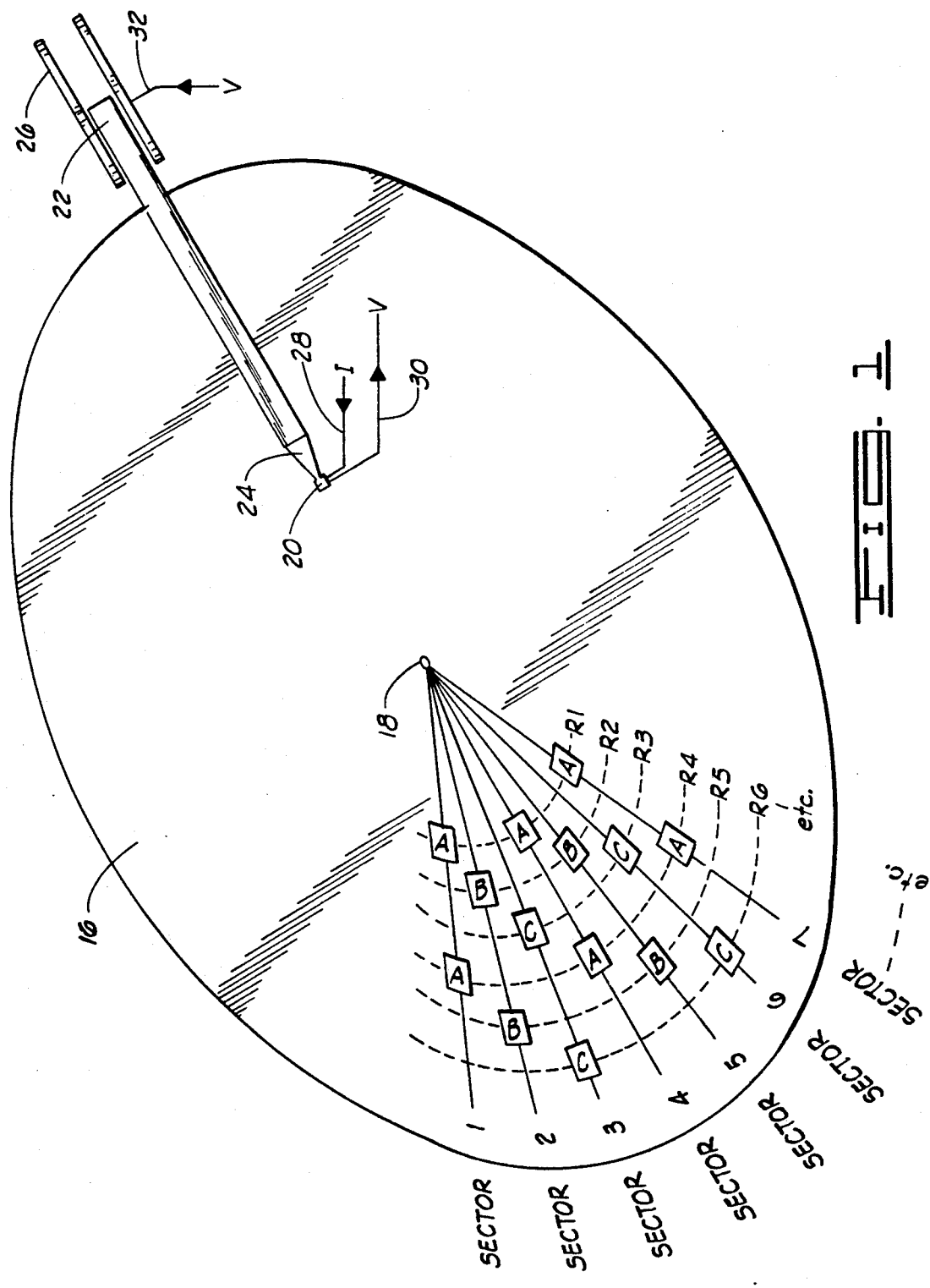
FIG. 1 is a schematic view of a magnetic information storage disk with servo patterns positioned thereon in accordance with the present invention.

In the drawings, there is shown in FIG. 1 a magnetic information storage disk 16 rotatable about a central axis 18 by means of a disk drive, not shown. Disk 16 is a "dedicated servo" disk, and contains no working data—only servo data.

Certain parts of a magnetic disk drive are shown in FIG. 1 to illustrate the writing of information on the upper surface of disk 16 and the subsequent reading of such information. These parts include a read/write transducer 20. The transducer is mounted to a movable carriage 22 by means of a support arm 24. A voice coil 26, mounted to the drive, supports carriage 22 for linear movement toward and away from axis 18, thus moving transducer 20 radially with respect to the disk. Typically, carriage movement and position are controlled through controlling electrical current to the voice coil 26. By varying the transducer radial position and rotating disk 16 with a drive motor (not shown), information may be written at any desired location on the disk surface.

Servo information is written on disk 16 by introducing an electrical current I to the transducer through a first line 28, with transducer 20 positioned over a selected portion of the disk surface. Transducer 20 also is adapted to read information previously written on disk 16, generating an electrical signal as represented by voltage V in a second line 30. As indicated by a third line 32, voltage V is an input to voice coil 26. Responsive to the V input, and a source of velocity commands (not shown), voice coil 26 either moves carriage 22 or maintains it substantially stationary in order to control the radial position of the transducer.

Shown on part of the surface of the disk 16 are six servo groups, R1-R6, radially and uniformly spaced apart from one another and generally concentric about axis 18. Each group can be a separate ring, or all groups can be part of a continuous spiral group, there being a selected index or angular position on disk 16 as a cutoff point between a group and the next subsequent group.

Three types of servo pattern groups, labelled A, B, and C respectively, are written on disk 16 during formatting, and need not be rewritten during normal operation. Servo pattern groups R1 and R4 contain only type A servo patterns, servo pattern groups R2 and R5 contain only type B servo patterns, while servo pattern groups R3 and R6 contain servo patterns only of type C. It should be understood that this sequence of A, B, and C is repeated for the desired number of servo tracks on disk 16, typically in the hundreds or thousands.

Servo patterns A, B, and C are further arranged angularly in sectors and radially in groups, such as represented by radii 1-7. Radii 1, 4, and 7 contain only type A servo patterns, radii 2 and 5 contain only type B patterns, while radii 3 and 6 contain only type C patterns. This A, B, and C sequence is repeated through the entire revolution of disk 16. Servo patterns A, B, and C thus are radially and angularly offset from one another, and arranged in a repeating sequence both in the radial and angular directions. Each individual A, B, and C pattern written by transducer 20 can be also read by transducer 20 at a later time for purposes of indicating radial position of arm 22 on disk 16. As is well understood by those skilled in this art, a transducer 20 when writing on a disk 16 produces individual A, B, and C patterns whose physical width, which is measured along a disk 16 radius (vertically in FIG. 2), is related to the width of the flux gap of transducer 20 itself, also measured along a radius and usually approximately equal to the physical width of the flux gap transducer 20. During reading the transducer produces a signal whenever a pattern passes beneath it. The strength of that signal is approximately proportional to the radial width of the portion of the transducer 20 flux gap beneath which the pattern sweeps. Thus, if the pattern sweeps beneath 40% of the gap width, the level of the signal generated by the winding of transducer 20 will be approximately 40% of the level generated by a pattern sweeping beneath all of the width of the transducer 20 flux gap. Thus, the signal level from transducer 20 is a measure of its alignment with a particular pattern. In general, the apparent width of a transducer 20 flux gap when reading substantially equals that when writing, and both are substantially equal to the physical width of the transducer itself.

Figure 2:
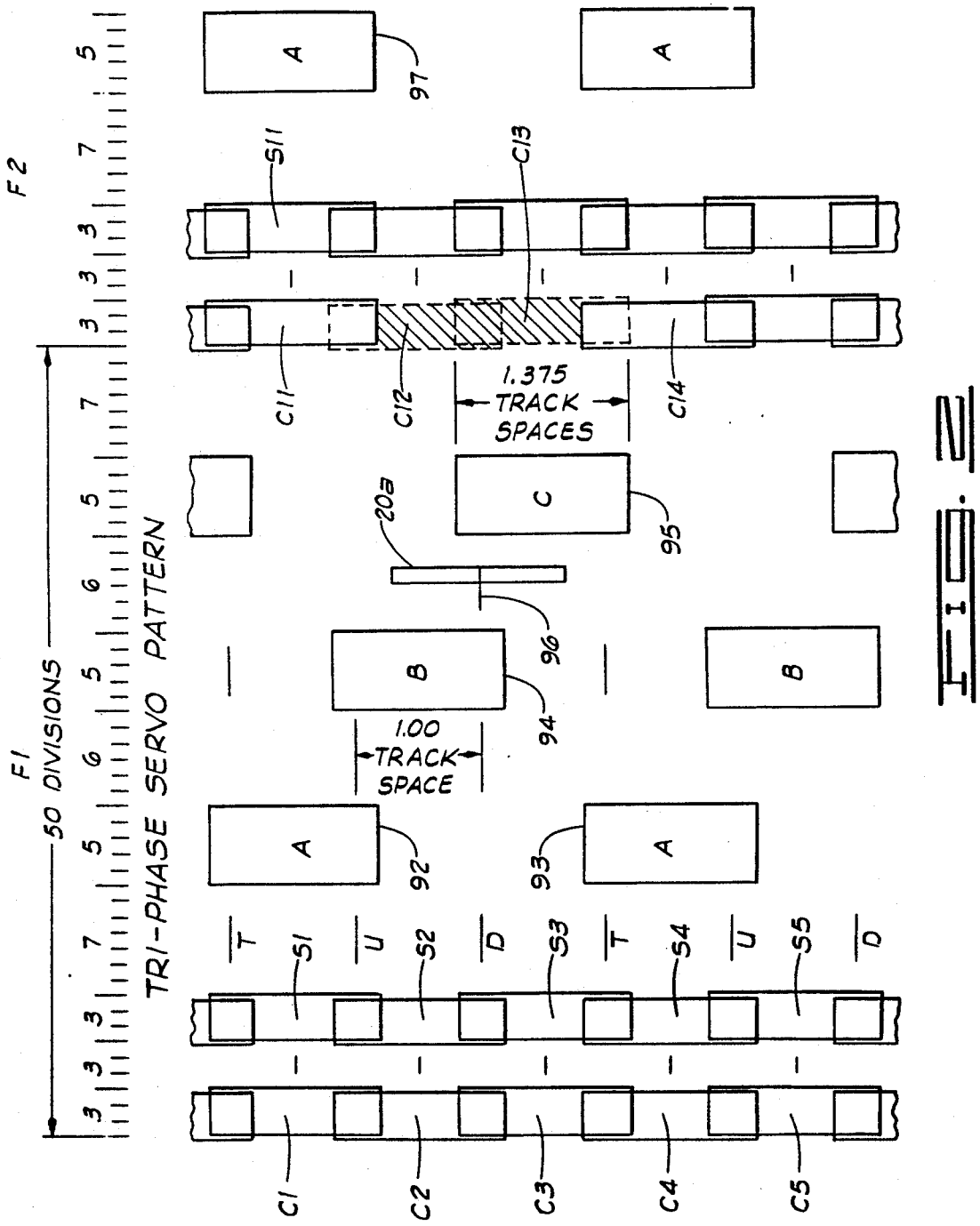
FIG. 2 is an enlarged schematic view showing a surface portion of the disk of FIG. 1.

Each group of consecutive radii containing A, B, and C servo patterns forms one of a series of substantially identical data frames F. One such frame F1, and a portion of the following frame F2, is shown in FIG. 2, which is an enlargement of a selected portion of the surface of disk 16.

At the leading edge of frame F1 is a column of overlapping code bits C1, C2, C3, C4, and C5 corresponding to servo groups R1 through R5. Spaced angularly from the code bits is a column of sync bits S1, S2, S3, S4, and S5. Neighboring code and sync bits overlap one another, and are slightly angularly displaced from one another because it is not possible with current technology to align them perfectly.

The code bits are used to indicate an index (a specific angular location) and to indicate the innermost and outermost servo tracks. For example, an index can be marked by intentionally avoiding writing code bits, as indicated at C12 and C13. Sync bits contribute to establishing the level for automatic gain control (AGC), and they enable differentiation between servo patterns A, B, and C based on their difference in phase or angular location.

Each data frame consists of 50 equal divisions. The leading edge of each servo pattern A is approximately seven divisions distant from the trailing edge of its associated sync bit (e.g., S1 or S4). The leading edge of each servo pattern B is separated from the trailing edge of its corresponding syn signal by approximately eighteen divisions, while the distance between the leading edge of each servo pattern C and the end of its associated sync bit is twenty-nine divisions. This difference in separation is sufficient to avoid any overlap between the patterns in adjacent servo groups. As a result, the electrical signal generated by transducer 20 when positioned over rotating disk 16, can be recognized as a signal of three separate phases, one phase corresponding to each type of servo pattern.

Note that the angular offset enables servo patterns A, B, and C to have a radial dimension wider than the corresponding radial distance between servo track centers. In this instance the servo pattern width is equal to 1.375 times the track space, though the optimal pattern width can vary with the specific application. These wider servo patterns have been found to improve signal amplitude by 43 percent. The greater signal amplitudes thus permit improved accuracy in positioning transducer 20. FIG. 2 also shows on the frame F1 the projection 20a of the flux gap of the transducer 20 which reads and writes the servo patterns with relative movement from left to right on the medium. Projection 20a represents the physical width of the transducer 20 and can be seen to be substantially equal in radial width to each servo, sync and code pattern as originally written. Gap projection 20a represents transducer 20 which has just swept past B pattern 94 at a radial position which generates a signal whose level is approximately 65% of maximum in that approximately 65% of the gap width passed over B pattern 94. Transducer 20 as shown by projection 20a is positioned to continue its motion by sweeping next across C pattern 95. By comparing the appropriate two signal levels the control system can determine the radial movement of transducer 20 necessary to center it on a desired track. In fact, the gap projection 20a is shown radially positioned so as to allow C pattern 95 to sweep past about 65% of transducer 20's width.

With the two signals thus generated by B pattern 94 and C pattern 95 nearly equal, the transducer 20 is by definition centered on a track whose centerline is indicated by the D hash mark 96. By selecting different pair combinations of radially adjacent A, B, and C patterns for comparison and shifting transducer 20 to equalize the signal levels from each pattern type in the pair, the transducer 20 can be centered on any desired track. Each such track is radially spaced from its neighbors by the original radial spacing of adjacent A, B, and C pattern groups. The individual A, B, and C pattern signals may be identified by the time which elapses from the sync bit signal to the A, B, or C pattern signal, the times for each of the three types being different from each other. Thus, it may be seen that transducer 20 may have a width or radial dimension greater than the individual track spacings and yet be able to both write and read the individual A servo patterns 92, 93, etc. Further, it can be seen that each radially aligned pattern group, i.e., all patterns at the same nominal radius in conjunction with a radially adjacent group, define a single servo track. Thus, the number of pattern groups plus one equals the number of servo tracks.

Figure 3:
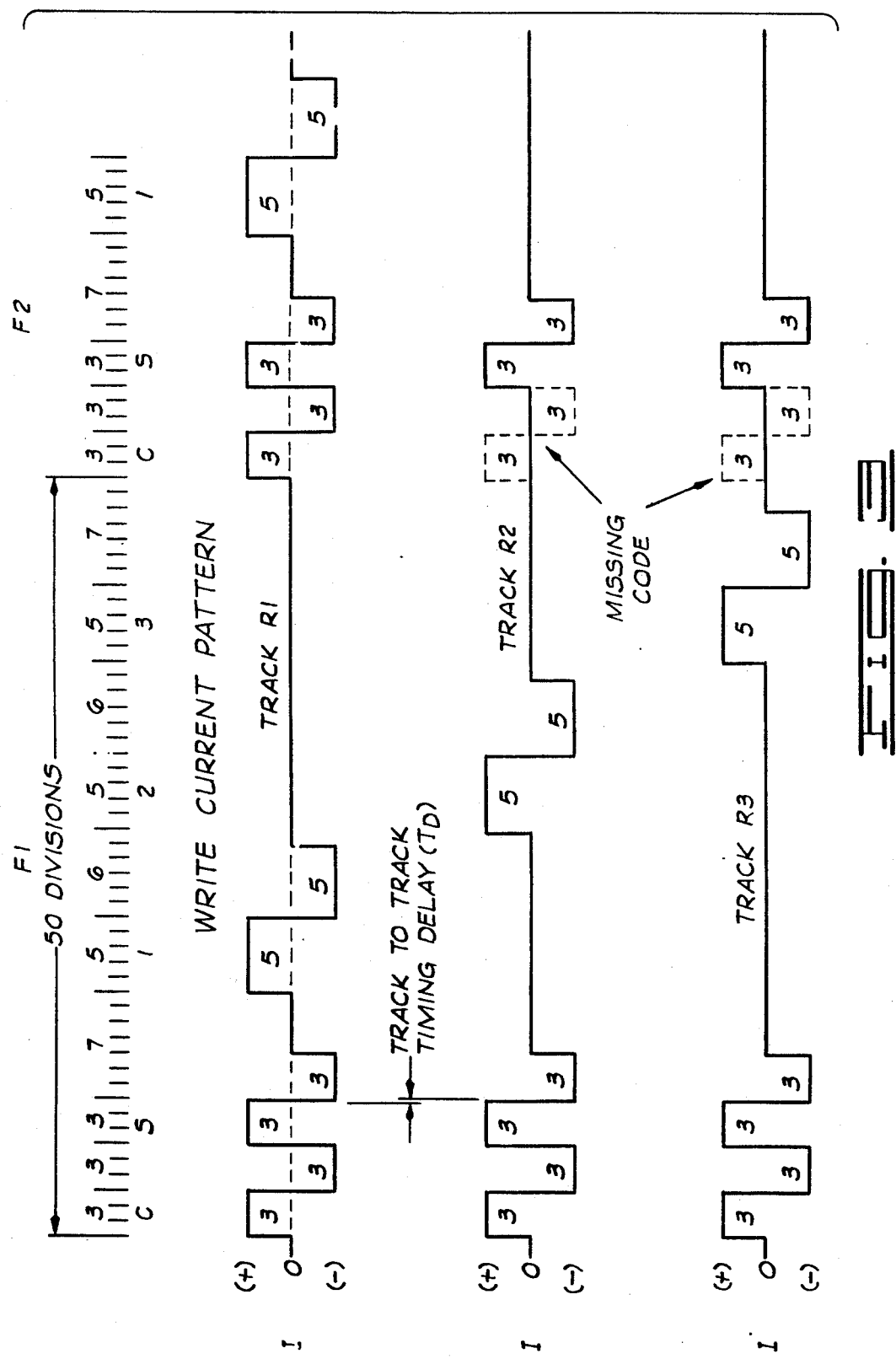
FIG. 3 is a timing diagram corresponding to the disk surface portion of FIG. 2 illustrating the writing of servo information on the disk.

FIG. 3 shows how direct current is introduced to transducer 20 while disk 16 is rotated, in order to write servo patterns A, B, and C on the disk. The writing of servo pattern groups R1, R2, and R3 is illustrated. In each case, as disk 16 is rotated over the desired servo pattern location, transducer 20 is subjected to one of three levels of the direct current; a positive level, a substantially equal but negative level, and a zero level equivalent to the absence of any current. The whole disk surface is first subjected to the negative current level to cause it to assume a first magnetic state or condition, e.g., "north". Each code bit and each sync bit then is written with positive current over three angular divisions, followed immediately by negative current over three angular divisions. In each case, it is the three divisions of positive current which actually forms the bit, by causing the surface portion to assume a second and opposite magnetic state, e.g., "south". The trailing three divisions of negative current serve to balance the positive current and avoid magnetization of transducer 20.

Servo patterns A, B, and C also are written with positive current, followed by negative current for an equal number of divisions. In FIG. 3, this number of divisions is five, although this is not critical. The zero level of current is applied whenever transducer 20, when writing track R2, for example, is angularly aligned with either servo pattern A in group R1 or with servo pattern C in track R3. Thus, interference with neighboring tracks during write is avoided.

The broken lines in groups R2 and R3 indicate where code bits are intentionally not written in order to mark an index, corresponding to the cross hatched areas C12 and C13 in FIG. 2. The track-to-track timing delay in an unwanted consequence of the inability to exactly align the sync and code bits as previously explained.

Figure 4:
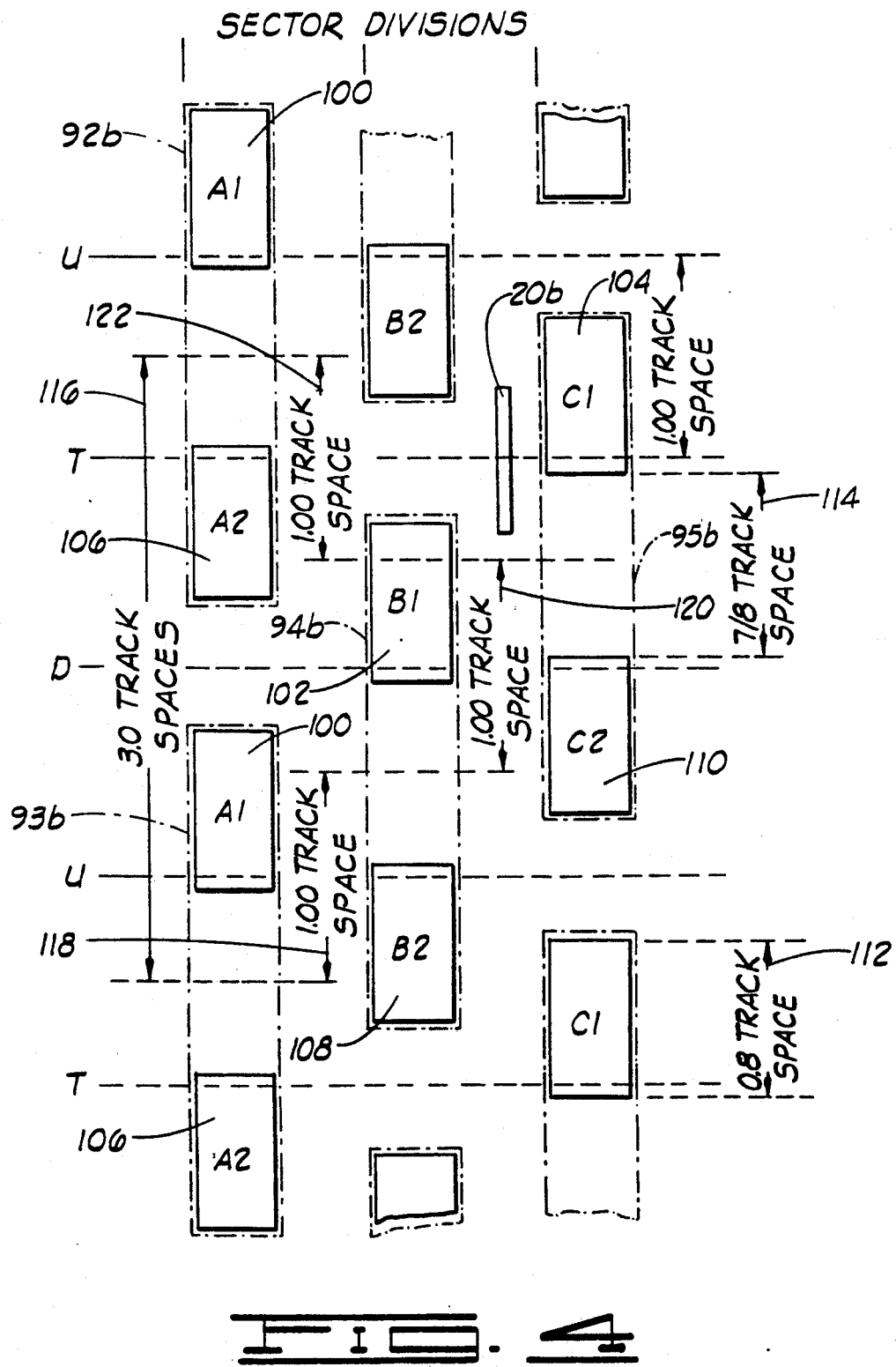
FIG. 4 shows an alternative embodiment of the present invention.

FIG. 4 is equivalent to FIG. 2, but illustrates an embodiment in which the servo patterns A, B, and C, indicated in dot-dash lines, are each divided into two radially spaced portions having radial widths less than the separation distance between adjacent data tracks for generation of servo signals using a read/write head having a,, radial width less than a track spacing. Thus, as shown in FIG. 4, the servo patterns 92b, 93b, 94b, and 95b, corresponding to the servo patterns 92, 93, 94, and 95 respectively of FIG. 2, are each comprised of a radially outermost first portion A1, B1, and C1 and a radially innermost second portion A2, B2, and C2. (The outermost, or A1, portions of the A patterns 92b and 93b have been designated by the reference numeral 100; the outermost, or B1, portion of the B pattern 94b has been designated by the reference numeral 102; and the outermost, or C1, portion of the C pattern 95b has been designated by the numeral 104. Similarly, innermost, or A2, portions of the A patterns 92b and 93b have been designated by the reference numeral 106; the innermost, or B2, portion of the B pattern 94b has been designated by the reference numeral 108; and the innermost, or C2, portion of the C pattern 95b has been designated by the numeral 110.)

Each of the portions 100, 102, 104, 106, 108, and 110 has a radial width substantially equal to the physical width of the transducer 20 as indicated by the projection 20b thereof in a position in which the transducer has just swept past the B pattern 102. As shown at 112 for a C1 portion, this width is preferably eight tenths of a track spacing. A suitable separation for the two portions of each A, B, and C pattern is seven eighths of a track spacing, as shown at 114 for the C pattern 95b, so that the total radial width of each of the A, B, and C patterns is approximately two and a half track spacings.

As in the embodiment shown in FIG. 2, the A, B, and C patterns are arranged in a plurality of radial sectors, indicated at the top of FIG. 4, that each contains a radially extending plurality of only one type of pattern, A, B, or C, and the A, B, or C patterns within one sector are radially offset, one from another by a distance of three track spacings as indicated at 116 for the A patterns 92b and 93b. Similarly, as in the embodiment shown in FIG. 2, the sectors are arranged in frames which each include one A pattern, one B pattern, and one C pattern, one such frame being comprised of the patterns 93b, 94b, and 95b. Further, and again as for the embodiment shown in FIG. 2, the frames are repeated radially from a selected inner radius on the disk to a selected outer radius thereon. Finally, within each frame as as for the embodiment shown in FIG. 2, the B patterns are radially offset one track spacing from the adjacent A pattern, as shown at 118 for the pattern 93b and 94b, and the C patterns are offset a further track spacing from the B patterns as shown at 120 in FIG. 4. Thus, the C pattern in one frame will be radially offset one track spacing from the A pattern of the succeeding frame as shown at 122 in FIG. 4.

It is understood that this invention can be practiced in connection with recording media other than magnetic disks. For example, in any medium capable of assuming two distinguishable states or conditions, servo patterns can be formed in the recording medium as longitudinal arrays, with neighboring longitudinal arrays consisting of servo patterns longitudinally offset from one another.

What is claimed is:

1. A process for writing servo information in substantially parallel tracks onto a magnetizable surface of a magnetic information storage medium, comprising the steps of:

exposing the surface to a magnetic field created by passing current of a first level through the winding of a transducer, said transducer being proximate the surface and moving with respect to it, to cause the surface to assume a first magnetic polarity;

for each of a plurality of selected, parallel portions of said surface, exposing the portion to a magnetic field created by passing current of a second, opposite level through the winding of the transducer for a sequence of selected time intervals to form in said surface a longitudinal array of servo patterns having a second, opposite magnetic polarity; and for each of said time intervals, supplying the first current level to the transducer immediately following the time interval and for a time equal to the duration of the time interval.

2. The process of claim 1 further including, between each step of exposing a portion of the surface to said magnetic field created by passing current of the second opposite level through the winding of the transducer, the step of shifting the transducer transversely with respect to the longitudinal arrays by an amount less than the width of the transducer flux gap.

* * * * *